United States Patent
Veshchikov et al.

(10) Patent No.: US 11,409,843 B2
(45) Date of Patent: Aug. 9, 2022

(54) METHOD FOR PROTECTING A SOFTWARE PROGRAM FROM COPYING

(71) Applicant: NXP B.V., Eindhoven (NL)

(72) Inventors: Nikita Veshchikov, Brussels (BE);
Joppe Willem Bos, Wijgmaal (BE);
Simon Johann Friedberger, Heverlee (BE); Christine van Vredendaal, Veldhoven (NL)

(73) Assignee: NXP B.V., Eindhoven (NL)

( * ) Notice: Subject to any disclaimer, the term of this patent is extended or adjusted under 35 U.S.C. 154(b) by 432 days.

(21) Appl. No.: 16/598,148

(22) Filed: Oct. 10, 2019

(65) Prior Publication Data
US 2021/0110002 A1    Apr. 15, 2021

(51) Int. Cl.
*G06F 21/10* (2013.01)
*G06N 20/00* (2019.01)
*G06F 21/60* (2013.01)

(52) U.S. Cl.
CPC ............ *G06F 21/10* (2013.01); *G06F 21/602* (2013.01); *G06N 20/00* (2019.01)

(58) Field of Classification Search
CPC ...... G06F 21/10; G06F 21/602; G06F 21/121; G06N 20/00
See application file for complete search history.

(56) References Cited

U.S. PATENT DOCUMENTS

| 5,826,009 A * | 10/1998 | Feng ................. G06F 21/75 726/33 |
| 9,407,857 B2 * | 8/2016 | Bang ................ G06Q 30/0239 |
| 2001/0051928 A1 * | 12/2001 | Brody ............... G06F 21/16 705/52 |

(Continued)

FOREIGN PATENT DOCUMENTS

| CA | 2724793 C | 1/2018 |
| CA | 2761065 C | 1/2018 |

(Continued)

OTHER PUBLICATIONS

Kasper, Emilia et al.; "Faster and Timing-Attach Resistant AES-GCM;" International Association for Crypotogic Research CHES 2009.

(Continued)

*Primary Examiner* — Abiy Getachew
(74) *Attorney, Agent, or Firm* — Daniel D. Hill (57) ABSTRACT

A method is provided for protecting a software program from copying. The method includes providing a first implementation of the software program. A second implementation of the software program is then provided. The second implementation provides a same functionality as the first implementation, and wherein the second implementation includes a plurality of dummy operations to increase a number of operations and an execution time of the second implementation compared to the first implementation. The dummy operations are encoded. The second implementation may then be compared to another software program to determine if the another software program is a copy of the first implementation of the software program. This allows a copy of the first implementation to be detected without disclosing the first implementation.

20 Claims, 5 Drawing Sheets

(56) References Cited

U.S. PATENT DOCUMENTS

| | | | | |
|---|---|---|---|---|
| 2003/0120938 A1* | 6/2003 | Mullor | ...................... | G06F 21/14 |
| | | | | 713/190 |
| 2003/0235125 A1* | 12/2003 | Akita | ............... | G11B 20/00086 |
| 2009/0094601 A1* | 4/2009 | Vstovskiy | .............. | G06F 21/123 |
| | | | | 711/E12.008 |
| 2018/0268130 A1* | 9/2018 | Ghosh | ................. | G06F 9/45558 |
| 2020/0117532 A1* | 4/2020 | Wolfson | .............. | G06F 11/0709 |

FOREIGN PATENT DOCUMENTS

| | | |
|---|---|---|
| CN | 104680473 A | 6/2015 |
| CN | 106651805 A | 5/2017 |
| WO | 2010100398 A1 | 9/2010 |

OTHER PUBLICATIONS

Khan, Asifullah et al.; "Machine Learning Based Adaptive Watermark Decoding in View of Anticipated Attack;" Pattern Recognition 41(8):2594-2610 Aug. 2008; DOI: 10.1016/j.patcog.2008.01.007.

Kirbiz, Serap et al.; "Robust Audio Watermark Decoding By Supervised Learning;" Acoustics, Speech, and Signal Processing, 1988. ICASSP-88., 1988 International Conference on 5:V-V • Jun. 2006; DOI: 10.1109/ICASSP.2006.1661387.

Le Merrer, et al.; "Adversarial Frontier Stitching For Remote Neural Network Watermarking," CoRR, vol. abs/1711.01894, 2017; http://arxiv.org/abs/1711.01894.

Peng, Hong et al.; "Image Watermarking Method In Multiwavelet Domain Based On Support Vector Machines;" The Journal of Systems and Software 83 (2010) 1470-1477; doi>10.1016/j.jss.2010.03.006.

Uchida, Yusuke et al.; "Embedding Watermarks Into Deep Neural Networks;" ACM on International Conference on Multimedia Retrieval—ICMR, B. Ionescu, N. Sebe, J. Feng, M. Larson, R. Lienhart, and C. Snoek, Eds. ACM, 2017, pp. 269-277; https://doi.org/10.1145/3078971.3078974.

Zhang, Jialong et al.; "Protecting Intellectual Property Of Deep Neural Networks With Watermarking;" Asia Conference on Computer and Communications Security—AsiaCCS, J. Kim, G. Ahn, S. Kim, Y. Kim, J. Lopez, and T. Kim, Eds. ACM, 2018, pp. 159-172.

U.S. Appl. No. 16/250,074; Inventor Veshchikov, Nikita, et al.; "Method for Determining if a Machine Learning Model has been Copied;" filed Jan. 17, 2019.

U.S. Appl. No. 16/511,082; Inventor Bos, Joppe Willem, et al.; "Method for Detecting if a Machine Learning Model has been Copied;" filed Jul. 15, 2019.

* cited by examiner

FIG. 5

METHOD FOR PROTECTING A SOFTWARE PROGRAM FROM COPYING

BACKGROUND

Field

This disclosure relates generally to software, and more particularly, to a method for protecting a software program from copying.

Related Art

A software program can be a valuable asset of a company. An algorithm or computer model that has been optimized for a given problem or application may form the basis of a software program. For example, a mapping application may include an algorithm for determining the best route to a destination. The algorithm may have evolved over many revisions of the application and taken a large amount of time and expense for the company to optimize. In another example, a machine learning (ML) that can recognize and classify traffic signs with a high degree of accuracy may have required an expensive training data set and a significant amount of time to train on the training data set. In both cases, the software programs can give the owners of the software programs a competitive advantage over similar services and software products.

Protecting a software program from copying has become a problem. Some software programs like, for example, a ML model may be copied, or cloned, even when an attacker does not have direct access to the program. For example, when a software program like, e.g., a ML model, is provided as a service, a user only has access to the inputs and outputs of the software program. To extract the software program when the software program is provided as a service, valid input samples are provided to the software program and the resulting outputs are compiled. Even when an attacker is just given access to the inputs and outputs, the functionality of a software program can be relatively easily copied. Also, extracting the software program in this manner can result in a near identical copy of the software program being produced. Once an attacker has copied the software program, it can be illegitimately used and monetized.

Watermarks are commonly used to mark and prove ownership of a file. The watermarks need to be detectable while being difficult to remove or modify when the software program is copied. Therefore, watermarks can be expensive and difficult to incorporate into software programs.

A comparison between two software programs to prove copying is difficult without disclosure of the software programs. Also, owners of the software programs may be hesitant to relinquish control over their software programs because of fear of copying or disclosure of proprietary information. It is possible that the functionality of the two programs can be compared if the software programs are retained on their servers and access to their interfaces is allowed. However, there is not a way for one or both parties to verify the identities of the software programs on the servers.

Therefore, a need exists for a method to protect a software program from copying without at least some of the problems described above.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a method for protecting a software program from copying. To provide the protection, a slow implementation of the software program is created that is very slow to execute but functionally equivalent to the program to be protected. The software program is made slow by adding one or more dummy operations to the program and then adding an inverse of the one or more dummy operations. In one embodiment, the dummy operations are encoded or encrypted to obfuscate the dummy operations. In one example, a function that can be added to the program as a dummy operation to increase execution delay is the identity function. The identity function may be implemented in the program using look up tables like a white-box implementation of a cryptographic algorithm. The functionality of the slow implementation remains identical to the functionality of the original fast implementation. Given the same input samples, the slow implementation will provide the same outputs. Because the slowed version of the program has been made significantly slower and larger than the original program to be protected, practical uses of the program are limited. Also, extracting the functionality of the program by providing input samples and observing the outputs would take too long to be practical. In addition, the functionality can be made difficult to extract from the program or to reverse engineer because by interleaving and embedding the dummy operations with the protected algorithm so that the dummy operations are difficult to distinguish from the real operations. Preferably, the dummy operations are also encoded or encrypted.

After creation, the slow to execute implementation of a faster original software program can be used to determine if another software program is likely to be an illegitimate copy of the faster original software program by verifying that the suspected copy provides the same outputs for the same input samples as the original software program.

In another embodiment, the slow implementation can be used to verify that the slow implementation includes the same algorithm as the original software programs as expected. In addition, the slow implementation may be used as a demonstration version of a software program with lower risk of reverse engineering or unauthorized commercial use. In this way, the comparison of two software programs can be done without disclosing the algorithms in the programs, thus protecting any proprietary information of the software program from being disclosed.

In accordance with an embodiment, there is provided, a method for protecting a software program from copying, the method including: providing a first implementation of the software program; providing a second implementation of the software program, wherein the second implementation provides a same functionality as the first implementation, and wherein the second implementation includes a plurality of dummy operations to increase a number of operations and an execution time of the second implementation compared to the first implementation; and comparing the second implementation to another software program to detect a copy of the first implementation by comparing a first plurality of outputs from the second implementation to a second plurality of outputs from the another software program when a plurality of input samples is provided to both the second implementation and to the another software program. The second implementation of the software program may be provided to a subscriber of the first implementation, wherein the second implementation may be usable by the subscriber to verify that the second implementation has a same functionality as the first implementation. The another software program may be a subsequent implementation of the first implementation of the software program. The plurality of dummy operations may include an identity function. The identity function may be implemented in the second implementation using a lookup table. The identity function may be encoded. The method may further include adding an inverse of the encoded identity function. The software program may be a trained machine learning model.

In another embodiment, there is provided, a method for determining if a software program is a copy, the method including: generating a slow implementation of an original software program, wherein the slow implementation includes a plurality of encoded dummy operations to cause the slow implementation to have a relatively longer execution time than the original software program; providing the slow implementation of the original software program to a subscriber of a service providing access to the inputs and outputs of the original software program; generating a plurality of input samples and providing the plurality of input samples to the original software program and to the slow implementation of the software program; comparing, by the subscriber, a first plurality of outputs received from another software program to a second plurality of outputs received from the slow implementation in response to receiving the plurality of input samples; and determining, by the subscriber, if the first plurality of outputs substantially equals the second plurality of outputs. The method may further include storing the original software program on a server for access by the subscriber. The method may further include comparing a first execution time for executing the slow implementation to a second execution time for executing the original software program. The original software program may be a trained machine learning model. The plurality of encoded dummy operations may include an identity function implemented using a lookup table. The method may further include adding an inverse of the plurality of encoded dummy operations. The another software program may be a modified version of the original software program.

In yet another embodiment, there is provided, a method for protecting a software program from copying, the method including: generating, by a first entity, a first implementation of the software program; generating a second implementation of the software program, wherein the second implementation provides a same functionality as the first implementation, and wherein the second implementation includes a plurality of encoded dummy operations; providing the second implementation to third entity; the third entity providing a plurality of input samples to the second implementation and to a suspected copy of the first implementation, the suspected copy from a second entity, and in response, receiving a plurality of outputs from the second implementation and the suspected copy; the third entity comparing the plurality of outputs from the second implementation to the plurality of outputs from the suspected copy; and determining that the suspected copy is a copy of the first implementation if the plurality of outputs from the second implementation is substantially the same as the outputs from the suspected copy. The plurality of encoded dummy operations may be provided to increase a number of operations and an execution time of the second implementation compared to the first implementation. The plurality of encoded dummy operations includes an identity function implemented using a lookup table. The third entity may be different than the first and second entities. The method may further include adding an inverse of the plurality of encoded dummy operations.

Figure 1:
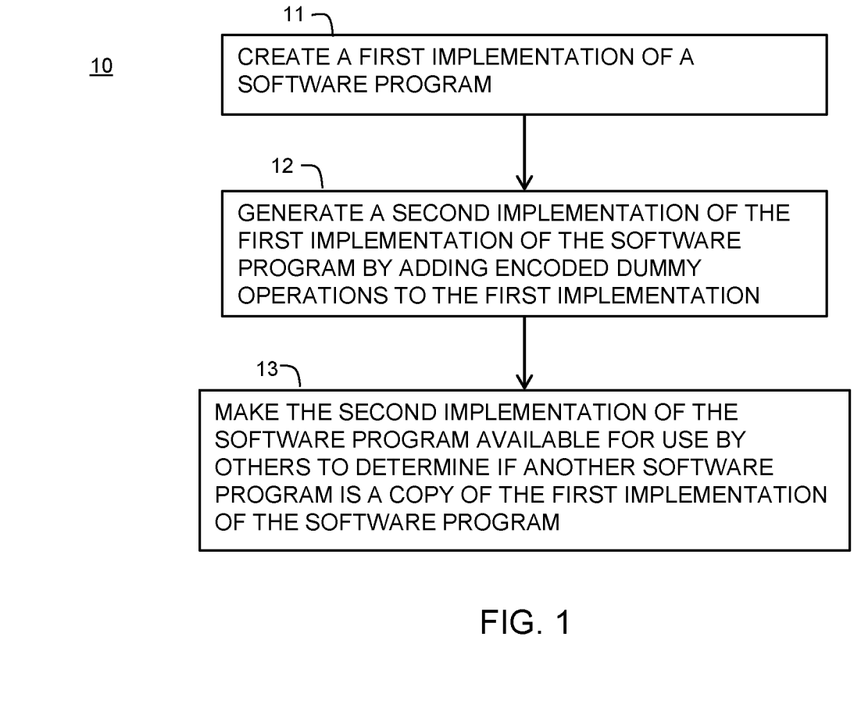
FIG. 1 illustrates a flowchart of a method for detecting copying of a software program in accordance with an embodiment.

FIG. 1 illustrates a flowchart of method 10 for detecting copying of a software program in accordance with an embodiment. At step 11, a first implementation of a software program is created. The software program may be used to generate revenue for a company and may be available for use on a server by other entities as either a paid or unpaid service. The program may be, for example, a trained machine learning (ML) model. At step 12, a second implementation of the software program is created. The second implementation is implemented so that it would be difficult to extract the functionality of first implementation from the second implementation. In one embodiment, dummy operations are added to the first implementation to create the second implementation. The dummy operations are encoded. The dummy operations may also include a plurality of difficult-to-invert transformations of an algorithm in the first implementation. For purposes of discussion, an algorithm is implemented using a list of instructions for receiving an input, accomplishing a task on the input, and outputting a result. The first implementation is characterized as being a fast, efficient, and small software program. In contrast, the intent of the dummy operations is to make the second implementation a very large and slow version of the first implementation. The second implementation would require a large memory space, and be very slow to complete execution, without changing the execution of the program's algorithm. In one embodiment, the dummy operations may be an identity function. The identity function reproduces the input at the output as shown below, where $N$ is an integer:

| Input x  | 0 | 1 | 2 | 3 | 4 | 5 | 6 | 7 | ... | N |
| Output x | 0 | 1 | 2 | 3 | 4 | 5 | 6 | 7 | ... | N |

The dummy operations may be implemented using a sequence of lookup tables as used in, e.g., a white-box implementation of a cryptographic algorithm. A secret key may be incorporated into the computations by using the lookup tables. Also, secret encoding may be added to the lookup tables to make it very difficult and impractical to extract the contents of the tables including the secret keys. After adding the encoding, the inverse of the encoding is added. The inverse encoding may be added to a subsequent lookup table. Generally, it is desirable to implement software in a way that is reasonably small and easy to execute. However, in this case, the goal is to artificially increase the size and number of lookup tables and to obfuscate the operations used. The very large size requires a large amount of memory space to store compared to the storage required for the first implementation. The slow implementation is designed to be impractical, e.g., approximately 1,000 to 1,000,000 times slower to execute that the original software program. An attacker would not able to copy and use the slow implementation in an industrial setting.

Thus protected, at step 13, the second implementation of the software program may be made available by the software owner for use by other entities for verification purposes. The other entities may be companies or people. The second implementation can be used to verify that the first implementation of the software program is the software program loaded on, e.g., a remote server, the use of which is being paid for. Also, the second implementation may be used to determine if another software program is an illegitimate copy of the first software program. The use of the second implementation for the comparison may be discrete and without the knowledge of the owner of the software or third parties. Because the second implementation has been bloated with additional encoded dummy operations, it can be made public without a significant threat of the algorithms in the second implementation being learned by others. By releasing and using the second implementation to detect copying instead of using the first implementation, the original first implementation can remain secret and protected from being disclosed and/or copied.

Figure 2:
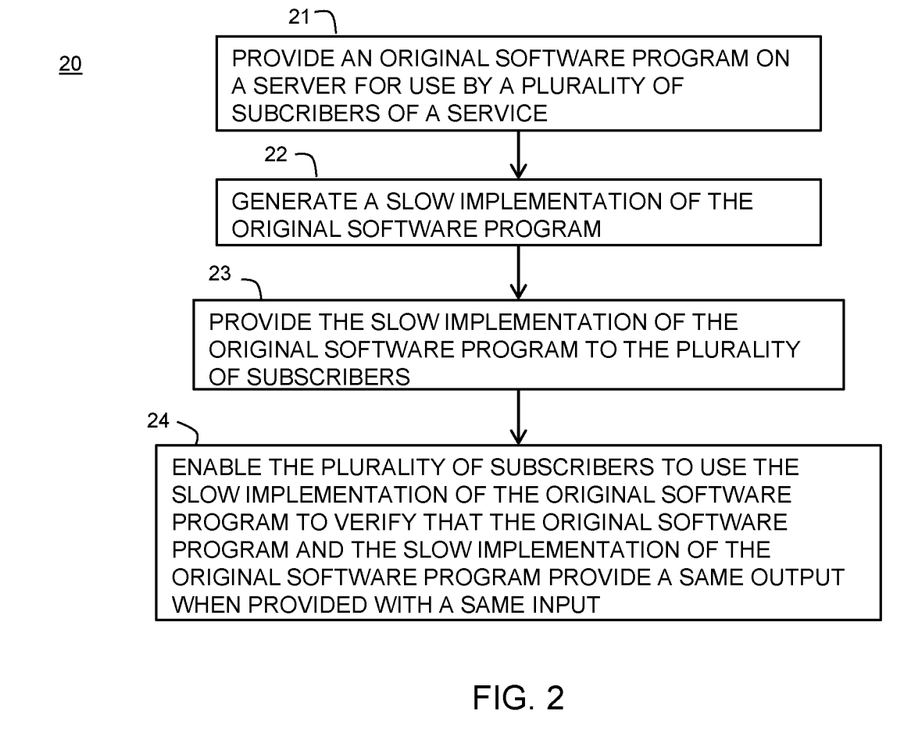
FIG. 2 illustrates a flowchart of a method for verifying a software program in accordance with an embodiment.

FIG. 2 illustrates a flowchart of method 20 for verifying a software program in accordance with an embodiment. At step 21, an original software program is provided on a server for use by a plurality of subscribers. The use of the original software program may be subject to a fee, or free of charge. At step 22, a slow implementation of the original software program is generated. The slow implementation may be implemented from the original software program as discussed above in the discussion of FIG. 1. At step 23, the slow implementation of the original software program is provided to users of the original software program. The original software program may include proprietary algorithms that the owner may want to protect from disclosure. The algorithms of the slow implementation are the same as the original software program but have been obfuscated by the dummy operations and encoded so that the risk of an attacker discovering the algorithms is relatively low. At step 24, the creator of the slow implementation (which may be the owner of the original software program), enables the plurality of subscribers to use the slow implementation of the original software program to verify that the original software program is the genuine original software program. This may be performed by providing the same input samples to both programs and comparing the outputs. If the outputs of both programs are the same, then the slow implementation most likely includes the same algorithm as the original software program. For some embodiments, the verification may have to be performed multiple times to increase a certainty in the results. For example, during the comparison, potential communication problems with the server may occur during message transmission that may skew the results. The comparison should also be performed on the same hardware platforms, or at least platforms of similar performance. Note that for some software programs, e.g., a ML model, the outputs of the two software programs may not be identical but the outputs would be substantially identical. Because the slow implementation is very slow, it is impractical for almost any use other than verification of the original software program.

Figure 3:
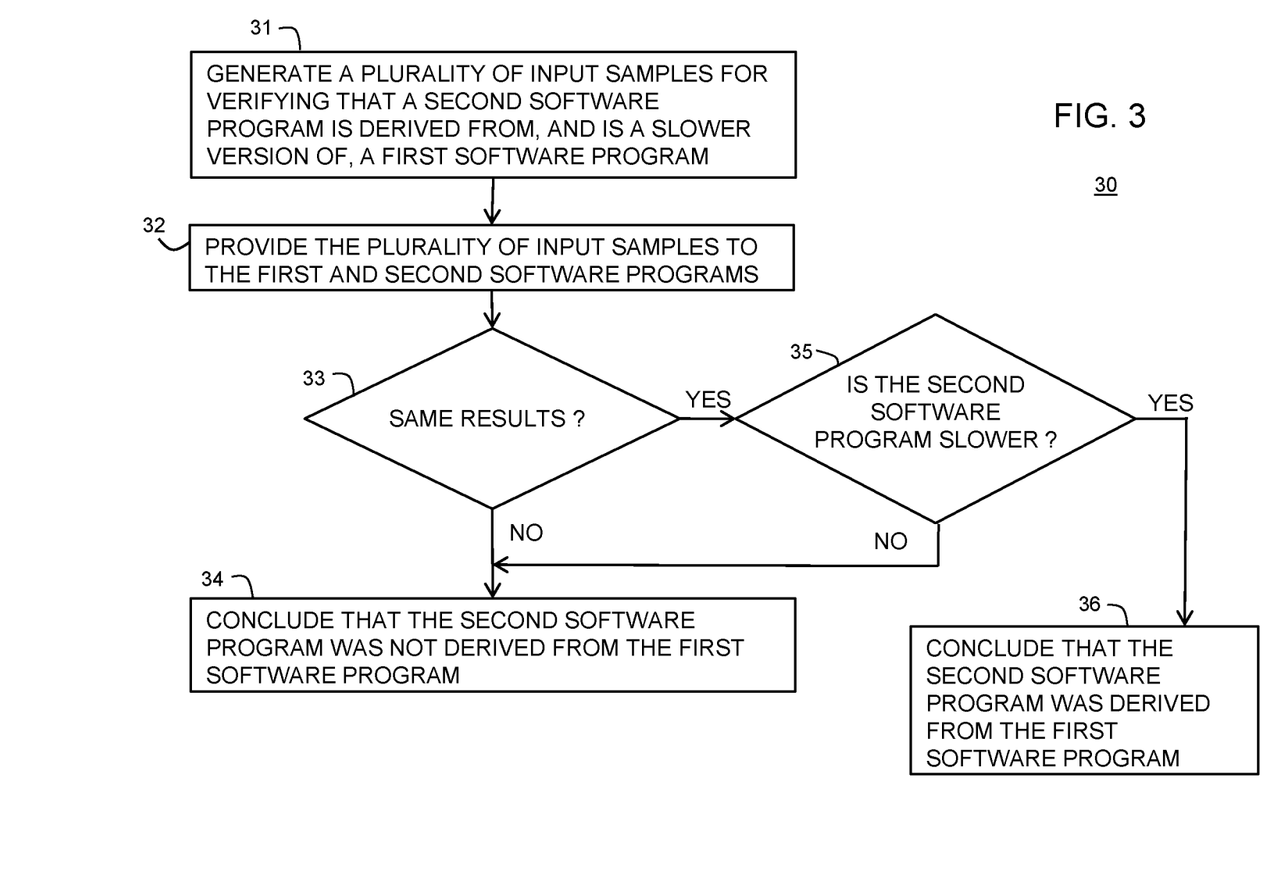
FIG. 3 illustrates a flowchart of a method for verifying a software program in accordance with another embodiment.

FIG. 3 illustrates a flowchart of method 30 for verifying a software program in accordance with another embodiment. At step 31, a plurality of input samples for verifying that a second software program is derived from, and is a slower version of, a first software program. The plurality of input samples would preferably be a large set of input samples. For example, the large set may be in a range of about 100 to 3000 input samples. In another embodiment, the number of inputs may be different. At step 32, the plurality of input samples is input to the first and second software programs. The results of the first and second software programs are output and evaluated. At decision step 33, it is determined if the outputs of the first and second software programs are substantially the same. If the outputs are not the same, the NO path is taken to step 34, and the second software program was not derived from the first software program. The difference may be because the first software program was substituted with another software program having a different algorithm, or the original software program may have been updated after the second software program was created. If at step 33, the outputs are substantially the same, then the YES path is taken to decision step 35, and it is determined if the second software programs is slower than the first software program. If yes, then the method proceeds to step 36, where it is concluded that the second software program was derived from and is a slower version of the first software program. However, if the second software program is not slower than the first software program, the NO path is taken to step 34 and it is concluded that the second software program is not derived from the first software program.

Figure 4:
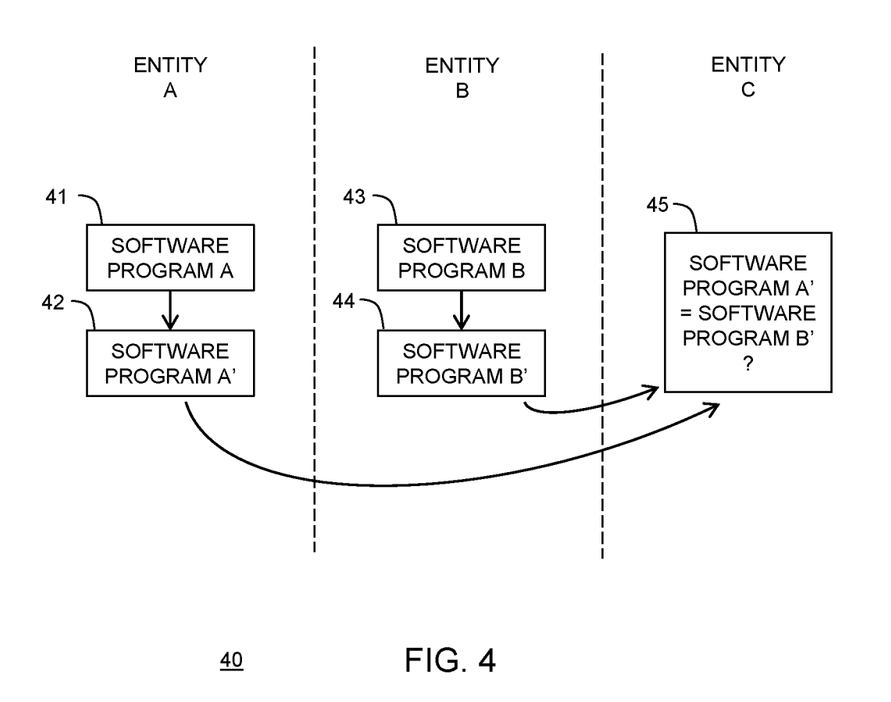
FIG. 4 illustrates a diagram of a method to allow another entity to verify a software program in accordance with an embodiment.

FIG. 4 illustrates a diagram of method 40 to allow another entity to verify a software program in accordance with an embodiment. For various reasons, it may be desirable for a comparison of software programs to be performed by a third party. For example, the parties involved may not trust each other. FIG. 4 illustrates entities A, B, and C. Entity A owns software program A 41 and entity B owns software program B 43. In one scenario, entity A may believe that software program B 43 of entity B is an illegitimate copy of software program A 41. Both entities then agree to have their software programs compared by third party entity C. Entity A derives software program A' 42 from software program A 41, where software program A' 42 is a slow implementation that was created using the method described above. Likewise, entity B derives software program B' 44 from software program B 43, where software program B' 44 is a slow implementation that was created from software program B 43 using the method described above. Entity A and entity B both provide their slow implementations to entity C for comparison. Entity C may be a third party that is not associated with either of entity A and entity B. The algorithms of the slow implementations are relatively safe from disclosure because of they have been obfuscated as described above with the dummy operations and encodings. Also, the slow implementations are too slow for entity C to make practical use of. Using a plurality of inputs, entity C compares at comparison 45 the outputs of software program A' 42 and software program B' 44. If the outputs are the same, then it may be concluded that software program B 43 is a copy of software program A 41. Alternately, software program A' 42 can be compared to software program B 43 if entity B does not make a slow implementation of software program B 43 and provides access to software program B 43.

Figure 5:
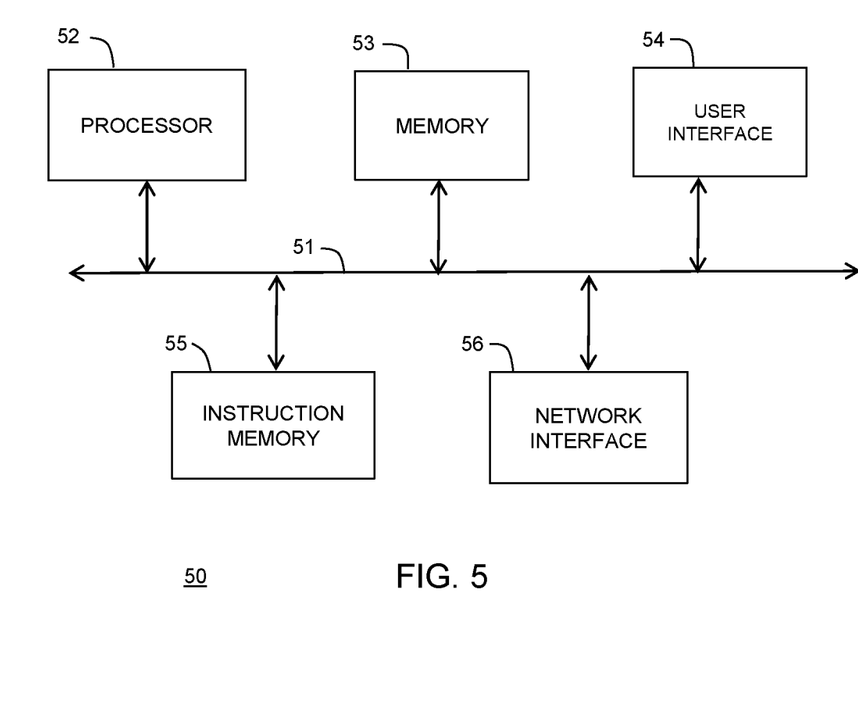
FIG. 5 illustrates a data processing system suitable for implementing the described methods.

FIG. 5 illustrates data processing system 50 suitable for executing the software programs of FIGS. 2-4. Data processing system 50 may be implemented on one or more integrated circuits and may be used in an implementation of the described embodiments. Data processing system 50 includes bus 51. Bus 51 may be used to convey one or more of data, address, and/or control information. Connected to bus 51 is processor 52, memory 53, user interface 54, instruction memory 55, and network interface 56. Processor 52 may be any hardware device capable of executing instructions stored in memory 53 or instruction memory 55. For example, processor 52 may execute the machine learning algorithms. Processor 52 may have multiple processing cores. Processor 52 may be, for example, a microprocessor, field programmable gate array (FPGA), application-specific integrated circuit (ASIC), or similar device. Processor 52 may be implemented in a secure hardware element and may be tamper resistant.

Memory 53 may be any kind of memory, such as for example, L1, L2, or L3 cache or system memory. Memory 53 may include volatile memory such as static random-access memory (SRAM) or dynamic RAM (DRAM), or may include non-volatile memory such as flash memory, read only memory (ROM), or other volatile or non-volatile memory. Also, memory 53 may be implemented in a secure hardware element. Alternately, memory 53 may be a hard drive implemented externally to data processing system 50. In one embodiment, memory 53 is used to store data used in the execution of instructions.

User interface 54 may be connected to one or more devices for enabling communication with a user such as an administrator. For example, user interface 54 may be enabled for coupling to a display, a mouse, a keyboard, or other input/output device. Network interface 56 may include one or more devices for enabling communication with other hardware devices. For example, network interface 56 may include, or be coupled to, a network interface card (NIC) configured to communicate according to the Ethernet protocol. Also, network interface 56 may implement a TCP/IP stack for communication according to the TCP/IP protocols. Data samples for classification may be input via network interface 56, or similar interface. Various other hardware or configurations for communicating are available.

Instruction memory 55 may include one or more machine-readable storage media for storing instructions for execution by processor 52. In other embodiments, both memories 53 and 55 may store data upon which processor 52 may operate. Memories 53 and 55 may also store, for example, encryption, decryption, and verification applications. Memories 53 and 55 may be implemented in a secure hardware element and be tamper resistant.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, NVM, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for protecting a software program from copying, the method comprising:
    selecting a first implementation of the software program to be protected from copying;
    creating a second implementation of the software program, wherein the second implementation provides a same functionality as the first implementation, and wherein the second implementation includes a plurality of dummy operations to increase a number of operations and an execution time of the second implementation on a hardware platform compared to the first implementation running on the same hardware platform; and
    comparing the second implementation to another software program on the hardware platform to detect a copy of the first implementation by comparing a first plurality of outputs from the second implementation to a second plurality of outputs from the another software program when a plurality of input samples is provided to both the second implementation and to the another software program, wherein it is determined that the another software program is a copy of the first implementation of the software program without extracting the functionality of the another software program.

2. The method of claim 1, wherein the second implementation of the software program is provided to a subscriber of the first implementation, wherein the second implementation is usable by the subscriber to verify that the second implementation has a same functionality as the first implementation.

3. The method of claim 1, wherein the another software program is a subsequent implementation of the first implementation of the software program.

4. The method of claim 1, wherein the plurality of dummy operations comprises an identity function.

5. The method of claim 4, wherein the identity function is implemented in the second implementation using a lookup table.

6. The method of claim 5, wherein the identity function is encoded.

7. The method of claim 6, further comprising adding an inverse of the encoded identity function.

8. The method of claim 1, wherein the software program is a trained machine learning model.

9. A method for determining if a software program is a copy, the method comprising:
    generating a slow implementation of an original software program, wherein the slow implementation includes a plurality of encoded dummy operations to cause the slow implementation to have a relatively longer execution time than the original software program;

providing the slow implementation of the original software program to a subscriber of a service providing access to the inputs and outputs of the original software program;

generating a plurality of input samples and providing the plurality of input samples to the original software program and to the slow implementation of the software program;

comparing, by the subscriber, a first plurality of outputs received from another software program to a second plurality of outputs received from the slow implementation in response to receiving the plurality of input samples; and determining, by the subscriber, that the first plurality of outputs substantially equals the second plurality of outputs, wherein it is determined that the another software program is a copy of the original software program without extracting the functionality of the another software program.

10. The method of claim 9, further comprising storing the original software program on a server for access by the subscriber.

11. The method of claim 9, further comprising comparing a first execution time for executing the slow implementation to a second execution time for executing the original software program.

12. The method of claim 9, wherein the original software program is a trained machine learning model.

13. The method of claim 9, wherein the plurality of encoded dummy operations comprises an identity function implemented using a lookup table.

14. The method of claim 13, further comprising adding an inverse of the plurality of encoded dummy operations.

15. The method of claim 9, wherein the another software program is modified version of the original software program.

16. A method for protecting a software program from copying, the method comprising:

generating, by a first entity, a first implementation of the software program;

generating a second implementation of the software program, wherein the second implementation provides a same functionality as the first implementation, and wherein the second implementation includes a plurality of encoded dummy operations;

providing the second implementation to third entity;

the third entity providing a plurality of input samples to the second implementation and to a suspected copy of the first implementation, and in response, receiving a plurality of outputs from the second implementation and the suspected copy;

the third entity comparing the plurality of outputs from the second implementation to the plurality of outputs from the suspected copy; and determining that the suspected copy is a copy of the first implementation if the plurality of outputs from the second implementation is substantially the same as the outputs from the suspected copy, wherein it is determined that the suspected copy is a copy of the first implementation without extracting the functionality of the suspected copy.

17. The method of claim 16, wherein the plurality of encoded dummy operations is provided to increase a number of operations and an execution time of the second implementation compared to the first implementation.

18. The method of claim 16, wherein the plurality of encoded dummy operations comprises an identity function implemented using a lookup table.

19. The method of claim 16, wherein the third entity is different than the first and second entities.

20. The method of claim 16, further comprising adding an inverse of the plurality of encoded dummy operations.

\* \* \* \* \*